United States Patent [19]
Chen

[11] Patent Number: 5,957,517
[45] Date of Patent: Sep. 28, 1999

[54] STRUCTURE CLAMP DEVICE FOR THE CLINCHING AND CONVEYANCE OF UNUSUALLY SHAPED OBJECTS

[76] Inventor: Yu-Fu Chen, No. 49, U Twu Ku, Lin 9, Yeong Fu Li, Dah Shi City, Taoyuan, Taiwan

[21] Appl. No.: 09/193,230

[22] Filed: Nov. 17, 1998

[51] Int. Cl.$^6$ .................................................... B25J 15/10
[52] U.S. Cl. ........................................ 294/87.1; 294/86.4
[58] Field of Search .................................. 294/86.4, 87.1, 294/88, 119.1, 902; 901/30–32, 39; 269/265–267

[56] References Cited

U.S. PATENT DOCUMENTS

| | | | |
|---|---|---|---|
| 2,488,826 | 11/1949 | Peebles | 294/87.1 |
| 2,718,426 | 9/1955 | Nagy | 294/87.1 |
| 3,507,404 | 4/1970 | Pompe | 294/87.1 |
| 4,609,220 | 9/1986 | Scott | 294/87.1 |
| 4,797,248 | 1/1989 | Tsitsichvili | 294/87.1 |
| 5,688,013 | 11/1997 | Sehrt | 294/86.4 |

FOREIGN PATENT DOCUMENTS

| | | | |
|---|---|---|---|
| 839-987 | 6/1981 | U.S.S.R. | 294/87.1 |
| 1341-144 | 9/1987 | U.S.S.R. | 294/86.4 |
| 1382-803 | 3/1988 | U.S.S.R. | 294/87.1 |

*Primary Examiner*—Dean J. Kramer
*Attorney, Agent, or Firm*—Rosenberg, Klein & Bilker

[57] ABSTRACT

An improved clamp device structure for the clinching and conveyance of unusually shaped objects is provided and includes support rods equipped with steel clamp bars, of which the odd-numbered elements are fixed and the even-numbered elements are capable of leftward and rightward movement, or the even-numbered elements are fixed and the odd-numbered elements are capable of leftward and rightward movement. Installed at the upper extent of the support rods is a relief bar capable of the upward and downward movement that facilitates the clinching and conveyance of the unusually shaped objects. Since the steel clamp bars on the support rods are arrayed in a close configuration, the clinching range of the array is sufficient to accommodate a number of working objects and thereby enable the steel clamp bars to positively hold objects for conveyance. Furthermore, when utilized to release the working objects, the relief bar continues to descend and exert force against the top of the steel clamp bars, effectively releasing the working objects more smoothly and accurately.

1 Claim, 6 Drawing Sheets

STRUCTURE CLAMP DEVICE FOR THE CLINCHING AND CONVEYANCE OF UNUSUALLY SHAPED OBJECTS

BACKGROUND OF THE INVENTION

There are numerous methods of clinching and conveying working objects, including mechanical arm or suction pick-up devices currently in widespread utilization. While some conveyance procedures as well as position accuracy, and design schemes undeniably offer effective clinching and conveyance results that are convenient and efficient to manufacturers, the inventor of the invention herein is aware that when working objects are subjected to vibration on the production line during the conveying process and positioning accuracy is not possible, since the angle of mechanical arms cannot be set at the proper angle, position, and clamping force required to grasp the working object, clinching and conveyance are not achievable and many impractical events occur. Furthermore, in suction device and conveyance operations, the surface of the working objects must be flat. If the working objects on the production line are not sufficiently planar, then suction will not be possible and conveyance will be unachievable. While the aforesaid mechanical arm or suction pick-up approaches may provide a degree of significant practical value to manufacturers in actual utilization, working objects that are inaccurately placed or lack flat surfaces are excluded. Obviously, structural improvements are required to develop a more comprehensive means of clinching and conveying working objects.

Therefore, to achieve a more convenient and accurate method of clinching and conveying unusually shaped objects, the inventor of the invention herein completed the research and development based on the applicable theoretical principles, which culminated in the invention offered herein.

SUMMARY OF THE INVENTION

The primary objective of the invention herein is to provide a kind of improved structure clamp device for the clinching and conveyance of unusually shaped objects, of which the steel clamp bars are positioned on the support rods such that the odd-numbered (or even-numbered) members are fixed and immovable as well as interspersed with even-numbered (or odd-numbered) members capable of leftward and rightward movement. As a result, the fixed and immovable steel clamp bars on the support rods hold the working object, while the steel clamp bars capable of moving left and right on the support rods apply or release the clamping force on the working object. Furthermore, the range of the predetermined arrayed configuration thereof is patterned to accurately and smoothly clinch and release the working objects at the appropriate time.

Another objective of the invention herein is to provide a kind of improved structure clamp device for the clinching and conveyance of unusually shaped objects, of which when the aforesaid steel clamp bars that move to the left and right during a clamping or release operation of a working object, the aforesaid steel clamp bars insert into the intervals between the working objects in a preconceived manner relative to the distances separating the steel clamp bars on the support rods rather than to the center-to-center distance between the support bars. As a result, the aforesaid steel clamp bars are more closely arrayed on the support bars to enable smaller intervals between the working objects so as to positively and accurately clamp or release.

Yet another objective of the invention herein is to provide a kind of improved structure clamp device for the clinching and conveyance of unusually shaped objects, of which there is a relief bar at the upper extent of the support bars such that when releasing the work objects, the relief bar continues to descend and exerts force against each of the steel clamp bars to more effectively release the working objects at the set position with greater accuracy and smoothness.

Still another objective of the invention herein is to provide a kind of improved structure clamp device for the clinching and conveyance of unusually shaped objects that features a simple structure as well as being easy and convenient to install and utilize, providing a predetermined range of action that permits the precise and secure clinching and conveyance of a number working objects, while also permitting the smooth and accurate release of the clinched working objects in actual practice that is ideal and progressive and, furthermore, effectively achieves the clinching and conveyance of unusually shaped objects in an improved structure.

DETAILED DESCRIPTION OF THE INVENTION

Figure 1:
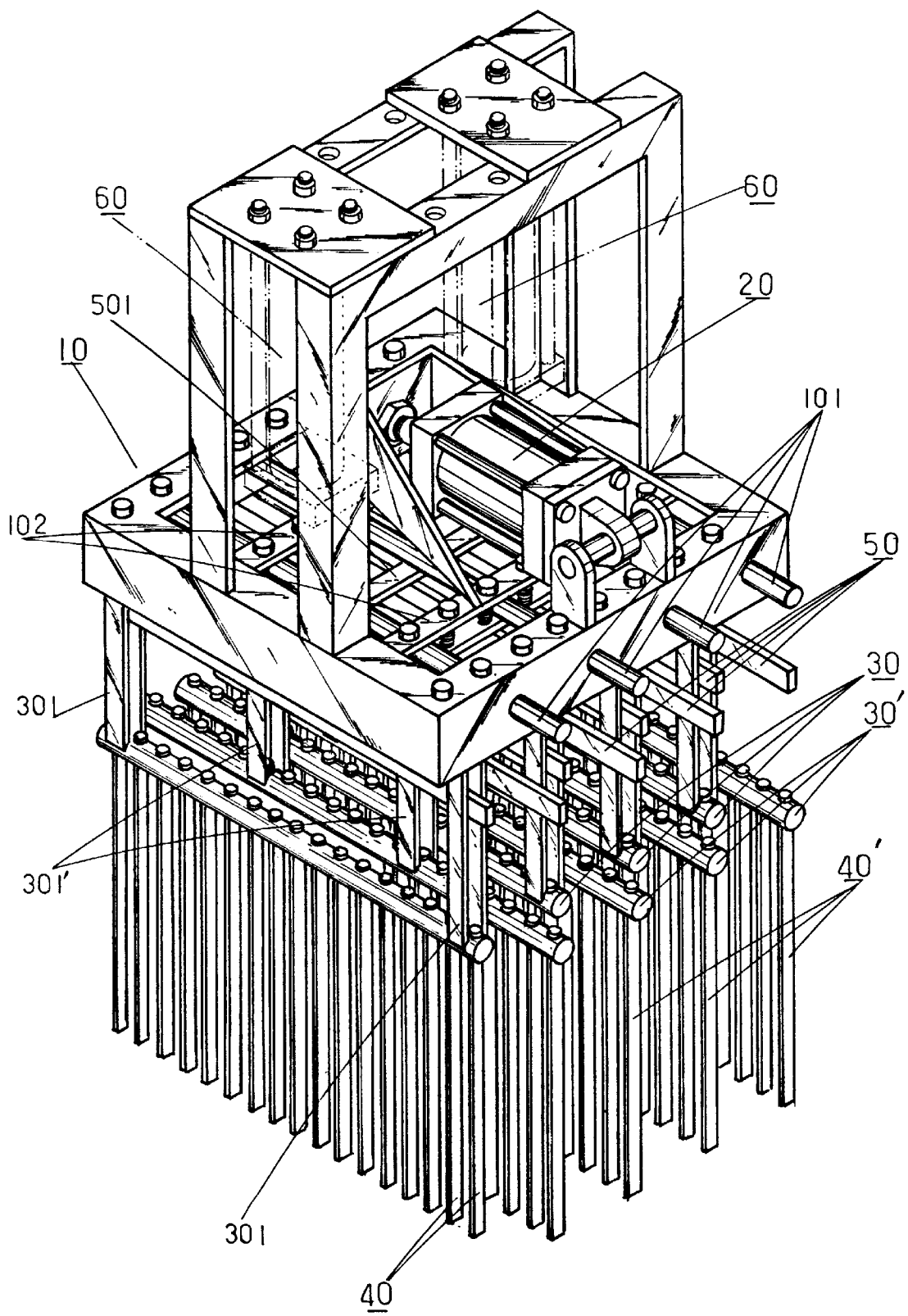
FIG. 1 is a perspective view of the present invention.
Figure 2:
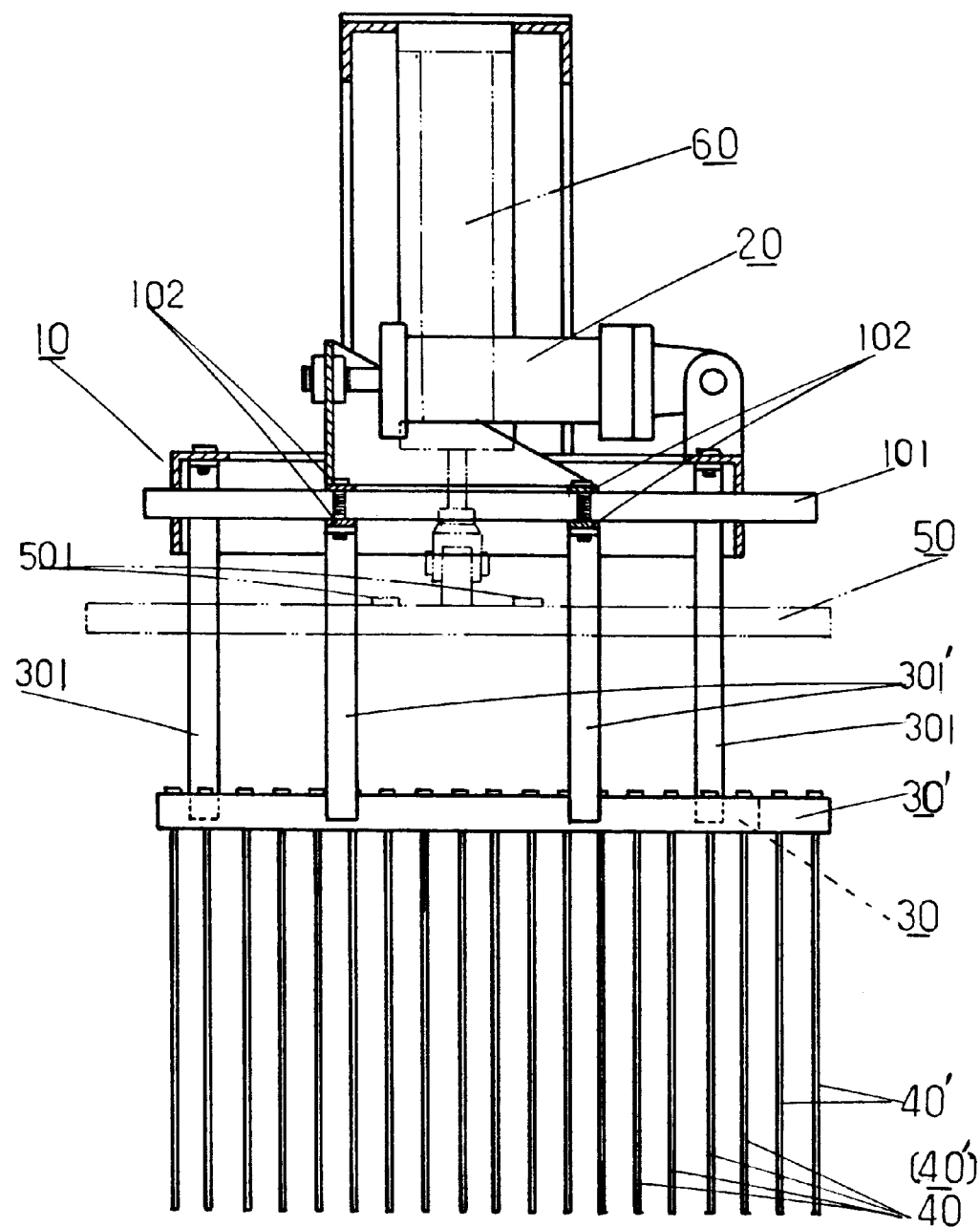
FIG. 2 is an elevation view of the present invention.

The improved structure clamp device for the clinching and conveyance of unusually shaped objects of the invention herein is generally comprised of a main frame (10) that is of predetermined dimensions appropriate to the work site of a machine or mechanical arm and which has a number of freely positionable guide rods (101) placed at a certain intervals apart and extending through the two ends and, furthermore, each guide rod (101) is conjoined to a coupling rod (102) that enables physical integration for simultaneous operating action; a horizontal driver unit (20) consisting of a hydraulic system, a pneumatic system, or other mechanical system that is installed on the main frame (10) and capable of moving the guide rods (101) to the left and right; a number of support rods (30) and (30') are suspended from the connecting rods (301) and (301'), respectively, at the two ends of the main frame (10) or suspended from the conjoinment at the coupling rods (102) of the guide rods (101), of which the support rods (30) of the main frame (10) are installed with the support rods (30') of coupling rods (102) in a crisscross configuration and, furthermore, the coupling rods (102) are capable of moving left and right along with the guide rods (101); a number of steel clamp bars (40) and (40') that are inserted into and suspended from the each of support rods (30) and (30') in a linear array; a number of relief bars (50) that are longer than the support rods (30) and (30'), positioned in the space above the support rods (30) and (30') and, furthermore, integrated into a single physical entity with a tie rod (501); two vertical driver units (60) consisting of a hydraulic system, a pneumatic system, or other mechanical system that is installed on the main frame (10) and capable of moving the relief bars (50) up and down.

Figure 3:
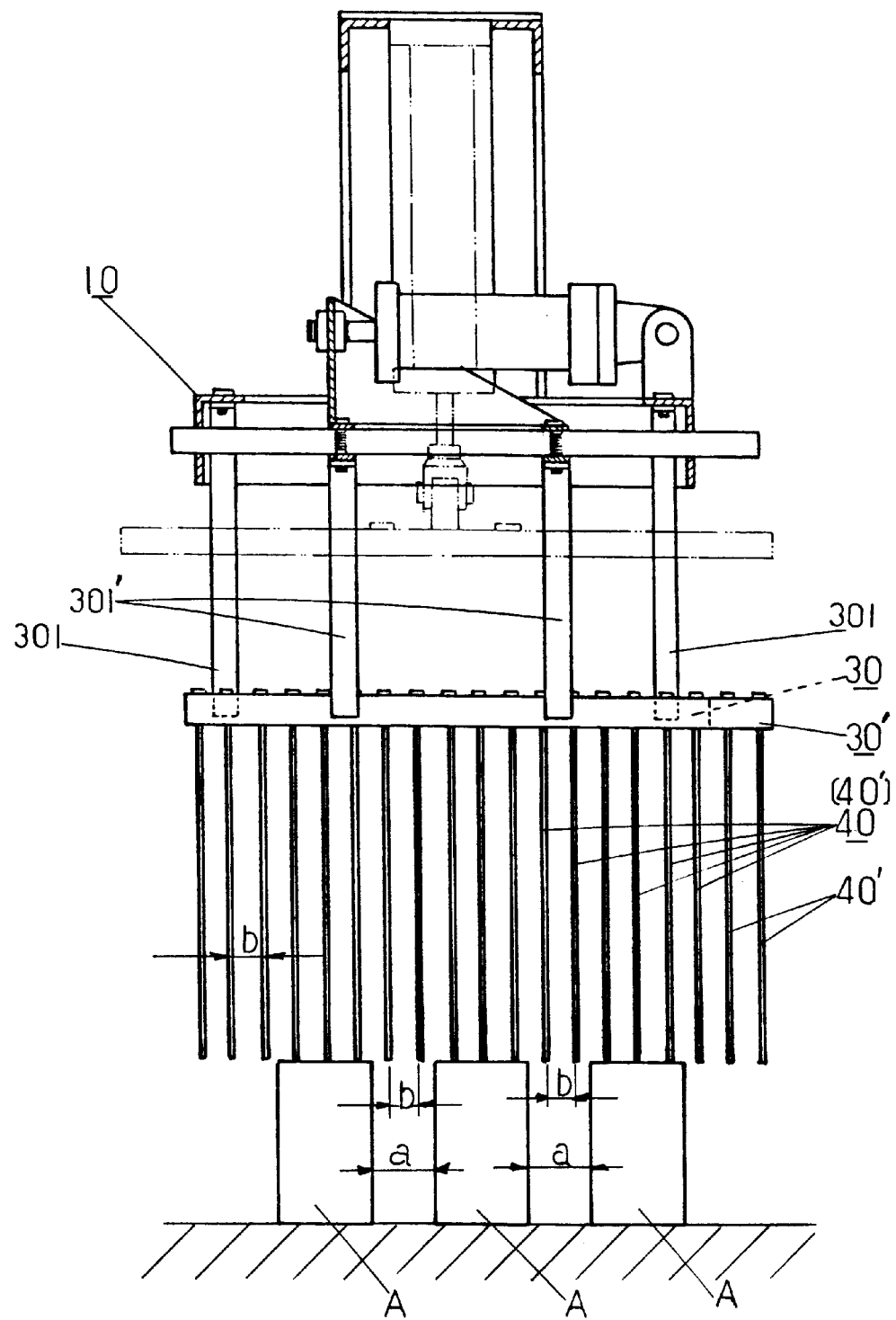
FIG. 3 is an elevation view depicting one stage of the clamping operation of the present invention.
Figure 4:
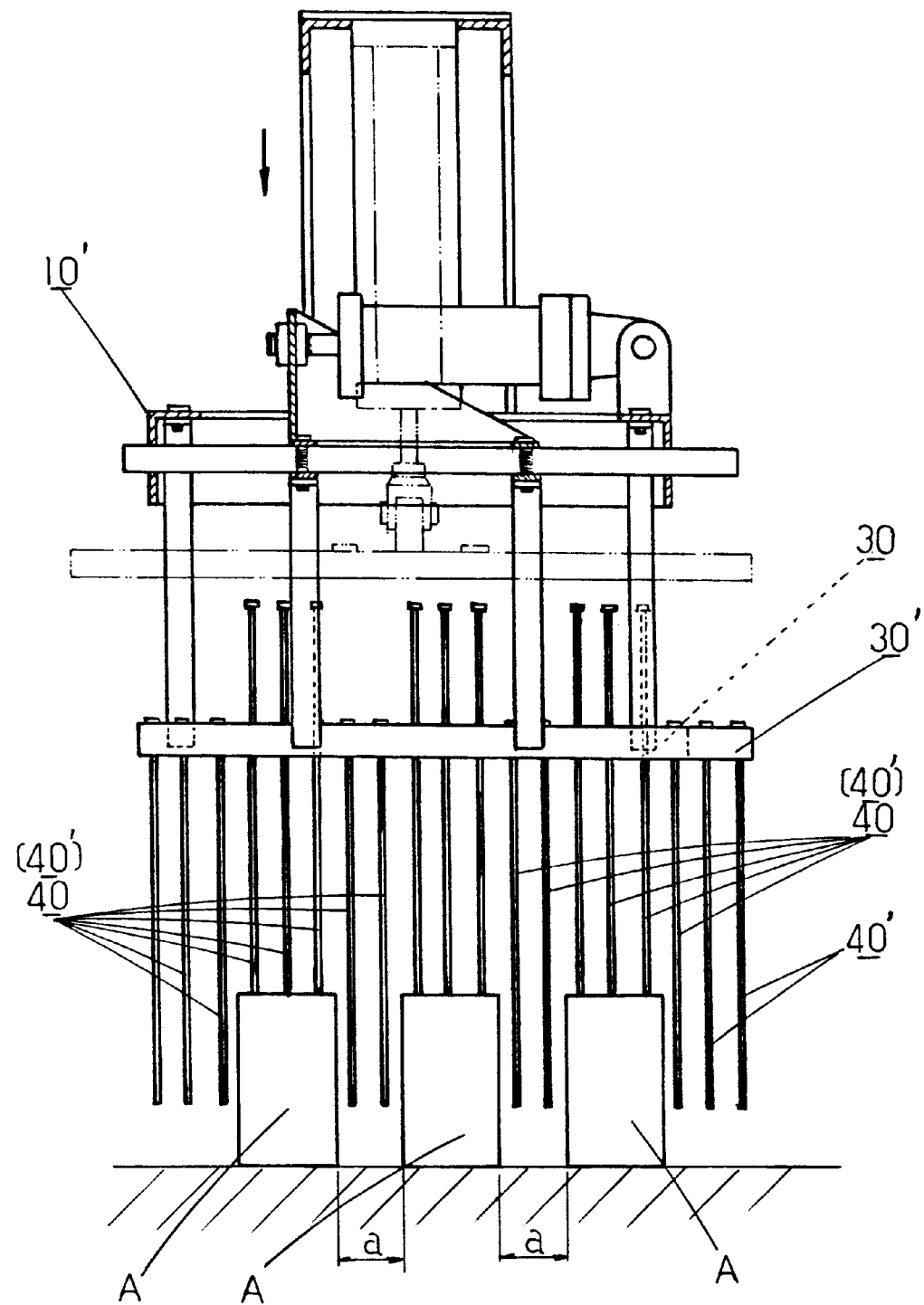
FIG. 4 is an elevation view depicting another stage of the clamping operation of the present invention.

Referring to FIG. 3 and FIG. 4, during utilization of the aforesaid structure of the invention herein, a number of work objects (A) are accommodated within the range of the arrayed intervals (a), and due to the perpendicular rather than horizontal orientation to the axis of the support rods (30) and (30'), the number of steel clamp bars (40) and (40') forming the intervals (a) are individually separated by the intervals (b) and are not determined by the center-to-center distances between the support rods (30) and (30') and, as a result, the steel clamp bars (40) and (40') on the support rods (30) and (30') are more closely arrayed, such that when intervals (a) between the work objects (A) is smaller, the aforesaid steel clamp bars (40) and (40') can be more easily, smoothly and accurately inserted. Furthermore, since each of the steel clamp bars (40) and (40') are actively inserted and suspended on the support rods (30) and (30'), therefore, when the main frame (10) is moved downward, some of the closely arrayed steel clamp bars (40) and (40') directly contact the tops of the working objects (A), with the remainder that have not made contact smoothly and accurately inserted into the intervals (a) or at the sides of the working object (A).

Figure 5:
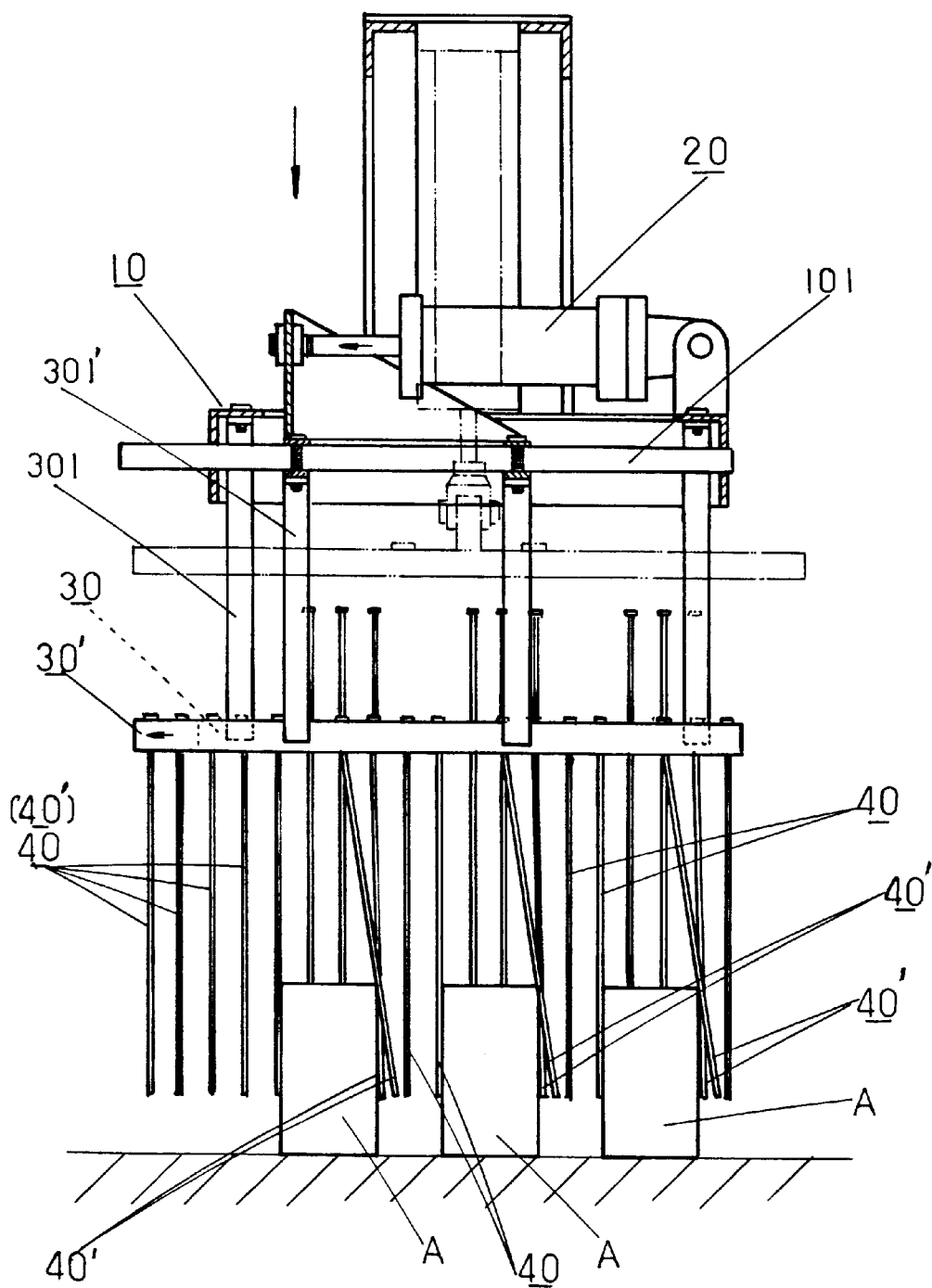
FIG. 5 is an elevation view depicting a further stage of the clamping operation of the present invention.

Referring to FIG. 5, since the aforesaid horizontal driver unit (20) is capable of moving each of the guide rods (101) of the main frame (10) at the support rod (30') of each guide rod (101) to the left and right along with the steel clamp bars (40') on the support rods (30') and the fixed unmoving steel clamp bars (40) on the support rod (30) remain in a crisscross configuration with the steel clamp bars (40'), therefore, as the driving action of the horizontal driver unit (20) continues, the respective insertion of the unmoving steel clamp bars (40) into the intervals (a) or at the sides of each working object (A) occurs directly and accurately to hold the working objects (A), and the steel clamp bars (40') become inserted into the intervals (a) along with the moving support rods (30') exerting a clamping force against the working objects (A), thereby enabling each working object (A) to be tightly held and accurately clinched during the operation.

Figure 6:
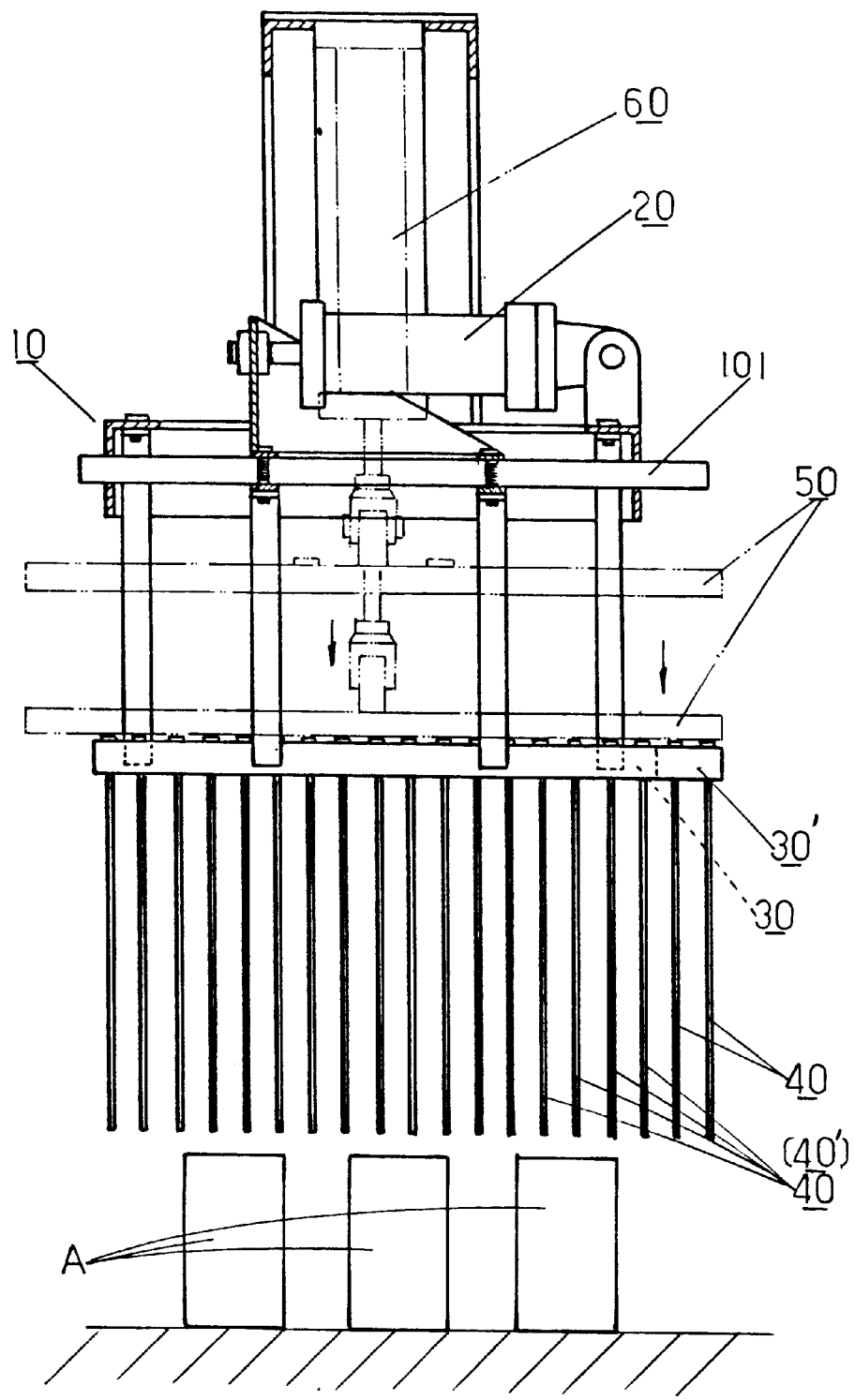
FIG. 6 is an elevation view depicting the release operation of the present invention.

Furthermore, referring to FIG. 6, when the clinching operation of the steel clamp bars (40) and (40') onto the working objects (A) is completed and the main frame (10) moves once again, after the working objects (A) are conveyed to a designated position, the aforementioned horizontal driver unit (20) is retracted until the clamping force by the steel clamp bars (40') of the moving support rods (30') is no longer being applied, the originally clinched working objects (A) are released during the operation. When each of the steel clamp bars (40) release the working objects (A), if the steel clamp bars (40') cannot be retracted due to recesses or protrusions in the shape of the working objects (A) or other related factors, then the relief bars (50) at the upper extent of the support rods (30) and (30') can be moved downward by the vertical driver unit (60) to apply pressure to the top ends of the steel clamp bars (40) and, consequently, the steel clamp bars (40) and (40') against the tops of the working objects (A) are immediately forced downward to dislodge the working objects (A) and thereby enable the completion of releasing the working objects.

What is claimed is:

1. A clamp device for the clinching and conveyance of unusually shaped objects comprising a main frame having a plurality of freely positionable guide rods placed at predetermined intervals apart and extending through two ends of the main frame, each guide rod being conjoined to a coupling rod that enables simultaneous operation thereof; a horizontal driver unit that is installed on the main frame and capable of moving the guide rods to the left and right; a plurality of support rods respectively suspended from a plurality of connecting rods, adjacent two ends of the main frame or suspended from the conjoinment at the coupling rods with the guide rods, the support rods being installed with respect to the coupling rods in a crisscross configuration, the coupling rods being capable of moving left and right along with the guide rods; a plurality of steel clamp bars that are inserted into and suspended from each of the plurality of support rods in a linear array; a plurality of relief bars that are longer than the support rods, said plurality of support rods being positioned at an upper extent of the support rods and integrated into a single physical entity with a tie rod; two vertical driver units consisting of a hydraulic system that is installed on the main frame and capable of moving the plurality of relief bars up and down, wherein the aforesaid steel clamp bars are closely arrayed on the aforesaid support rods; a first portion of the plurality of the steel clamp bars being fixed on unmoving support rods and are capable of clinching working objects, and a second portion of the plurality of the steel clamp bars being coupled on the support rods capable of leftward and rightward movement, the horizontal driver unit being operated to provide a clamping force onto the working objects or to release the working objects, subsequently the relief bars release the steel clamp bars from the working objects, the vertical driver units continue moving to exert a downward force onto the steel clamp bars.

* * * * *